(12) United States Patent
Lee et al.

(10) Patent No.: US 11,225,236 B2
(45) Date of Patent: Jan. 18, 2022

(54) ELECTRIC BRAKE BOOSTER EQUIPPED WITH A PRESSURE BALANCE DETECTING DEVICE

(71) Applicants: HYUNDAI MOTOR COMPANY, Seoul (KR); KIA MOTORS CORPORATION, Seoul (KR)

(72) Inventors: Joung-Hee Lee, Hwaseong-si (KR); Won-Seok Yim, Incheon (KR); Gwan-Hyeong Cha, Seoul (KR); Ung-Hee Shin, Yeosu-si (KR); Se-Ra Hwang, Suwon-si (KR); Sang-Hyun Shim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 126 days.

(21) Appl. No.: 16/688,427

(22) Filed: Nov. 19, 2019

(65) Prior Publication Data
US 2020/0189542 A1    Jun. 18, 2020

(30) Foreign Application Priority Data

Dec. 13, 2018 (KR) .................. 10-2018-0160979

(51) Int. Cl.
*B60T 13/12* (2006.01)
*B60T 13/16* (2006.01)
(Continued)

(52) U.S. Cl.
CPC .......... *B60T 13/165* (2013.01); *B60T 8/4077* (2013.01); *B60T 13/588* (2013.01); *B60T 13/62* (2013.01);
(Continued)

(58) Field of Classification Search
CPC .... B60T 13/165; B60T 13/588; B60T 8/4077; B60T 13/145; B60T 13/146;
(Continued)

(56) References Cited

U.S. PATENT DOCUMENTS 4,489,555 A * 12/1984 Leiber ................... B60T 13/145
60/534
4,603,918 A * 8/1986 Leiber ................... B60T 13/146
188/345
(Continued)

FOREIGN PATENT DOCUMENTS

KR        100947379 B1    3/2010
KR        20150022439 A   3/2015

*Primary Examiner* — Robert A. Siconolfi
*Assistant Examiner* — Stephen M Bowes
(74) *Attorney, Agent, or Firm* — Lempia Summerfield Katz LLC

(57) ABSTRACT

An electric brake booster is equipped with a pressure balance detecting device, which generates braking force. The electric brake booster includes: a first pressure device, which generates pressure as the driver manipulates the brake pedal; a second pressure device, which generates the same pressure as the first pressure device and generates driving power; a master chamber, which receives resultant force of brake pedal effort and driving power of a motor from a master piston that moves in the second pressure device; and a pressure balance detecting device, which detects whether a predetermined ratio is maintained between the pressure of the first pressure device applied to one side of the pressure balance detecting device and the pressure of the master chamber applied to the other side of the pressure balance detecting device.

16 Claims, 5 Drawing Sheets

(51) Int. Cl.
*B60T 17/22* (2006.01)
*B60T 13/62* (2006.01)
*B60T 13/74* (2006.01)
*B60T 8/40* (2006.01)
*B60T 13/58* (2006.01)

(52) U.S. Cl.
CPC .......... *B60T 13/746* (2013.01); *B60T 17/221* (2013.01); *B60T 2270/402* (2013.01); *B60T 2270/82* (2013.01)

(58) Field of Classification Search
CPC ...... B60T 13/166; B60T 13/66; B60T 13/662; B60T 13/74; B60T 13/745; B60T 13/746; B60T 11/24; B60T 17/221; B60T 2270/82; B60T 7/042
See application file for complete search history.

(56) References Cited

U.S. PATENT DOCUMENTS

| | | | | |
|---|---|---|---|---|
| 4,620,750 | A * | 11/1986 | Leiber | B60T 8/266 303/113.4 |
| 4,655,512 | A * | 4/1987 | Leiber | B60T 8/341 188/DIG. 1 |
| 4,662,687 | A * | 5/1987 | Leiber | B60T 7/042 303/113.3 |
| 4,776,643 | A * | 10/1988 | Leiber | B60T 7/042 303/113.4 |
| 4,919,493 | A * | 4/1990 | Leiber | B60T 8/00 303/113.4 |
| 5,246,281 | A * | 9/1993 | Leppek | B60T 1/10 303/114.1 |
| 2015/0203087 | A1* | 7/2015 | Ozsoylu | B60T 13/145 188/359 |
| 2017/0259797 | A1* | 9/2017 | Serrano | B60T 8/4077 |

* cited by examiner

ELECTRIC BRAKE BOOSTER EQUIPPED WITH A PRESSURE BALANCE DETECTING DEVICE

CROSS-REFERENCE TO RELATED APPLICATIONS

This application claims priority under 35 U.S.C. § 119 to Korean Patent Application No. 10-2018-0160979, filed on Dec. 13, 2018, in the Korean Intellectual Property Office, the disclosure of which is incorporated herein by reference in its entirety.

BACKGROUND

1. Field of the Disclosure

The present disclosure relates to an electric brake booster for a vehicle, and more particularly, to an electric brake booster, which is equipped with a pressure balance detecting device to uniformly maintain a predesigned boost ratio between a brake pedal effort and driving power of a motor in the electric booster having no pressure sensor.

2. Description of the Related Art

In general, most vehicles are mounted with power-assisted brake devices, i.e., power brakes, such that a driver may decelerate or completely stop the vehicle even though the driver presses a pedal with a comparatively small effort.

This configuration may be implemented by providing a brake device for a vehicle with a vacuum brake booster or a hydraulic brake booster as well as a hydraulic pressure transmission mechanism. Thus, this configuration provides brake assist power from the brake booster.

In this regard, Korean Patent No. 10-0947379 (Brake Safety Device for Vacuum Brake Booster) in the related art relates to a brake safety device for a vacuum brake booster and discloses the brake safety device for a vacuum brake booster which enables the vacuum brake booster to operate even though a vacuum pump for supplying compressed air to the vacuum brake booster breaks down.

However, the vacuum brake booster in the related art has a problem in that a separate electronic or mechanical vacuum pump needs to be additionally applied in a case in which a vacuum in an engine is insufficient.

The vacuum brake booster in the related art has a problem in that it is impossible to perform active braking in a state in which a driver does not apply the brake.

In this case, Korean Patent Application Laid-Open No. 10-2015-0022439 (Electric Booster Type Braking System and Method of Controlling the Same) discloses an electric booster type braking system and a method of controlling the same which perform uniform and stable control by initializing a mechanical origin position of a piston provided in the electric booster type braking system.

However, in the electro-hydraulic booster in the related art, a sub-master cylinder, which generates pressure when a driver manipulates a brake pedal, and a master cylinder, which receives pressure generated by an operation of a motor and receives the pressure from the sub-master cylinder, are formed in a straight line. Thereby, the booster needs to be installed to be necessarily adjacent to the brake pedal. As a result, there are problems in that a mounting position is limited and it is difficult to ensure a gap at the periphery.

SUMMARY OF THE DISCLOSURE

The present disclosure has been made in an effort to provide an electric brake booster equipped with a pressure balance detecting device, in which a pedal cylinder, which is separated from a stationary sensor, a master cylinder, and a boosting cylinder, is mounted in a brake booster in the related art to simplify a layout of the booster and improve a degree of design freedom. The present disclosure also provides a switch, which detects a pressure difference between the master cylinder and the boosting cylinder. The switch is mounted to uniformly maintain a predesigned boost ratio between a brake pedal effort and driving power of a motor in the electric booster having no pressure sensor.

An embodiment of the present disclosure provides an electric brake booster equipped with a pressure balance detecting device. The pressure balance detecting device generates braking force by using a resultant force of driving power of a motor and a brake pedal effort generated as a driver manipulates a brake pedal. The electric brake booster includes: a first pressure device, which generates therein pressure as the driver manipulates the brake pedal; a second pressure device, which generates therein the same pressure as the first pressure device and generates driving power for the motor as the motor connected to one side of the second pressure device operates; a master chamber, which receives the resultant force of the brake pedal effort and the driving power of the motor from a master piston that reciprocally moves in the second pressure device; and a pressure balance detecting device, which detects whether a predetermined ratio is maintained between the pressure of the first pressure device applied to one side of the pressure balance detecting device and the pressure of the master chamber applied to the other side of the pressure balance detecting device. The pressure balance detecting device further includes: a first switch, which operates when a ratio between the pressure of the first pressure device and the pressure of the master chamber is higher than the predetermined ratio; and a second switch, which operates when the ratio between the pressure of the first pressure device and the pressure of the master chamber is lower than the predetermined ratio.

The first pressure device may further include: a pedal chamber, which is supplied with a brake fluid from an oil reservoir through a pedal chamber supply flow path formed at an upper side of the pedal chamber and generates brake fluid pressure in accordance with the manipulation of the brake pedal; a push rod, which is rectilinearly moved in the pedal chamber in accordance with the manipulation of the brake pedal; and a pedal piston, which has one end coupled to the push rod and the other end connected to a return spring such that the pedal piston is reciprocally moved in the pedal chamber in accordance with the rectilinear motion of the push rod.

The upper side of the pedal chamber may be connected to the pedal chamber supply flow path which is supplied with the brake fluid from the oil reservoir.

The second pressure device may be connected to the first pressure device through a pedal chamber flow path.

The second pressure device may be formed integrally with the first pressure device.

The second pressure device may further include a boosting chamber, which generates the same brake fluid pressure as the first pressure device and has the other side coupled to the motor.

The second pressure device may further include: a screw, which is coupled to the motor and rotated in the second pressure device in accordance with the operation of the motor; and a nut, which is coupled to the screw and rectilinearly moved in accordance with the rotational motion of the screw and transmits the driving power of the motor to the master chamber.

The master piston may have one side in contact with the nut and the other side connected to a return spring connected to one end of the master chamber. Therefore, the master piston is reciprocally moved in the second pressure device in accordance with the rectilinear motion of the nut. The master piston transmits the resultant force of the brake pedal effort and the driving power of the motor to the master chamber.

The electric brake booster may further include a pedal sensor which measures a displacement of the brake pedal. The pedal sensor may measure a displacement of any one of the brake pedal, the push rod, and the pedal piston.

A sensor, which measures a rotation angle of the motor, may be embedded in the motor. A rotation amount of the motor may be determined depending on the displacement of the brake pedal.

The master chamber may be supplied with a brake fluid from an oil reservoir through a master chamber supply flow path formed at one side of the master chamber. The master chamber may be connected to an electronic stability control (ESC) module or a brake caliper through a master chamber flow path formed at the other side of the master chamber.

The pressure balance detecting device may operate under a condition in which pressure is generated in the first pressure device, and simultaneously, pressure is generated in the master chamber.

The pressure balance detecting device may further include: a bar-shaped support unit, which is mounted with springs for supporting a lower surface of the support unit and performs see-saw motion when a pressure ratio between the first pressure device and the master chamber is different from the predetermined pressure ratio; and a pivot unit, which defines an axis of the see-saw motion of the support unit by varying a mounting position depending on the predetermined pressure ratio between the master chamber and the first pressure device. The first switch and the second switch may be mounted at both sides of a lower portion of the support unit. Any one of the first switch and the second switch may operate in accordance with the see-saw motion of the support unit.

The pressure balance detecting device may further include: a master chamber connecting port, which is connected to the master chamber and receives the brake fluid in the master chamber; a pedal chamber connecting port, which is connected to the second pressure device and receives the brake fluid in the second pressure device; and hemispheric plugs, which are in close contact with a lower portion of the master chamber connecting port and a lower portion of the pedal chamber connecting port to maintain sealability against the brake fluid in the master chamber connecting port and the pedal chamber connecting port.

The pivot unit may further include: two protrusions, which protrude from an upper portion of the pressure balance detecting device such that the support unit is positioned between the protrusions; and a pivot pin, which penetrates the protrusions and the support unit to couple the pivot unit and the support unit.

The first switch may generate a signal for operating the motor rearward. The second switch may generate a signal for operating the motor forward.

The pressure balance detecting device may have a pressure balance detecting device supply flow path formed at one side of the pressure balance detecting device to be supplied with a brake fluid from an oil reservoir.

According to the present disclosure configured as described above, there are advantages with the simplified configuration of the flow paths such as cost reduction and a decrease in the probability of a breakdown.

According to the present disclosure, the ESC is utilized as an auxiliary actuator. As a result, there is an advantage in that the redundancy of the actuator is ensured when the booster breaks down.

According to the present disclosure, the stationary sensor is applied. As a result, there are advantages in that the size of the booster may be reduced, which is advantageous to a layout configuration and collision performance.

According to the present disclosure, the pedal cylinder and the boosting cylinder are separately configured through the flow paths. As a result, there are advantages in that a degree of design freedom is improved and gaps between peripheral components are ensured.

According to the present disclosure, the pressure balance detecting device is applied. As a result, there is an advantage in that it is possible to uniformly maintain the predesigned boost ratio between the brake pedal effort and the driving power of the motor even without a separate pressure sensor.

DETAILED DESCRIPTION OF THE EMBODIMENTS

Figure 1:
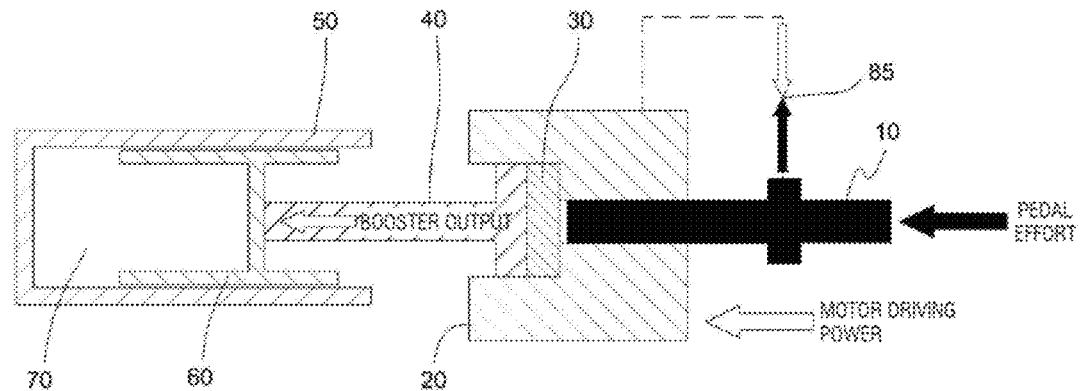
FIG. 1 is a view illustrating a state in which an electric booster in the related art operates.

Hereinafter, the present disclosureis described in detail with reference to the accompanying drawings. However, the present disclosure is not restricted or limited by theembodiments. Like reference numerals indicated in the respective drawings refer to members, which perform substantially the same functions.

FIG. 1 is a view illustrating a state in which an electric booster in the related art operates.

Referring to FIG. 1, the electric booster in the related art includes: a pedal rod 10 which transmits a pedal effort generated when a driver manipulates a brake pedal; a reaction disc 30 which is made of a rubber material and deformed depending on a state of force balance between a boosting body 20 and the pedal rod 10; a booster rod 40 which transmits an output of the booster to a piston 60; and a chamber 50 which defines a cylinder 70.

The electric booster in the related art includes the reaction disc 30 which is deformed depending on the state of force balance. A mobile displacement measuring sensor 85 is used to measure and compare a displacement of the boosting body 20 and a relative displacement of the pedal.

The pedal effort, which is generated when the driver manipulates the brake pedal, needs to be transmitted to the booster without involvement of the brake fluid. As a result, the booster in the related art is installed close to a back surface of the pedal.

Figure 2:
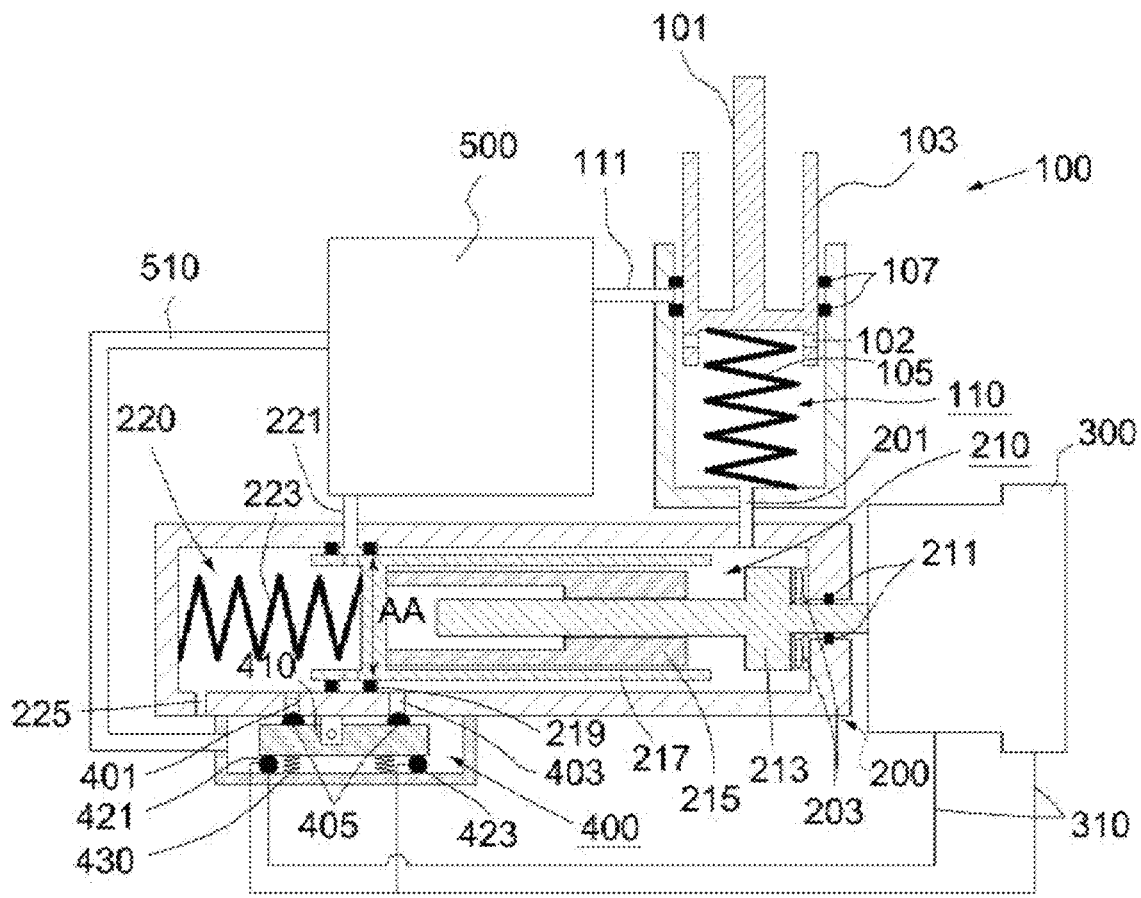
FIG. 2 is a view illustrating an electric brake booster equipped with a pressure balance detecting device according to the present disclosure.

FIG. 2 is a view illustrating an electric brake booster equipped with a pressure balance detecting device 400 according to the present disclosure.

Referring to FIG. 2, the electric brake booster equipped with the pressure balance detecting device 400 according to the present disclosure is a device that generates braking force by using resultant force of the driving power of a motor 300 and a brake pedal effort generated when the driver manipulates the brake pedal. The electric brake booster may include a first pressure device 100, a second pressure device 200, a master chamber 220, and the pressure balance detecting device 400.

The first pressure device 100 may generate pressure therein when the driver manipulates the brake pedal, and may include a pedal chamber 110, a push rod 101, and a pedal piston 103.

The pedal chamber 110 may receive a brake fluid through a pedal chamber supply flow path 111 which is formed at an upper side of the pedal chamber 110 and connected to an oil reservoir 500. In the first pressure device 100, the pedal chamber 110 may generate brake fluid pressure by means of reciprocating motion of the pedal piston 103 in accordance with the manipulation of the brake pedal.

The push rod 101 may be rectilinearly moved forward or rearward in the pedal chamber 110 as the driver manipulates the brake pedal.

One end of the pedal piston 103 is coupled to the push rod 101, such that the pedal piston 103 is reciprocally moved in the pedal chamber 110 in accordance with the forward/rearward movements of the push rod 101. The other end of the pedal piston 103 is connected to a return spring 105, such that the pedal piston 103 may return back to the original position.

In this case, the pedal piston 103 is reciprocally moved in the pedal chamber 110 while having a predetermined gap with the first pressure device 100 that surrounds the pedal chamber 110.

Seals 107 are provided at the upper side of the pedal chamber 110 and disposed in the gap between the pedal piston 103 and the first pressure device 100 in order to prevent a leakage of the brake fluid and generate pressure in the pedal chamber 110.

Flow path holes 102 are formed in a lower portion of the pedal piston 103. The brake fluid is supplied from the oil reservoir 500 to the pedal chamber 110 when the flow path hole 102 communicates with the pedal chamber supply flow path 111 between the seals 107 positioned at upper and lower sides thereof.

Figure 3A:
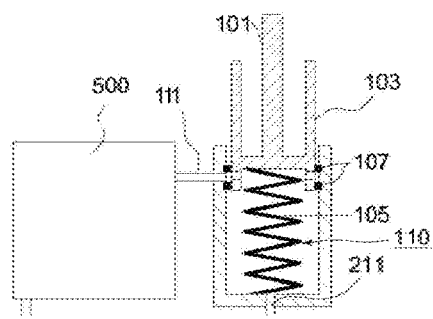
FIG. 3A is a view illustrating an initial position of a pedal piston according to the present disclosure.
Figure 3B:
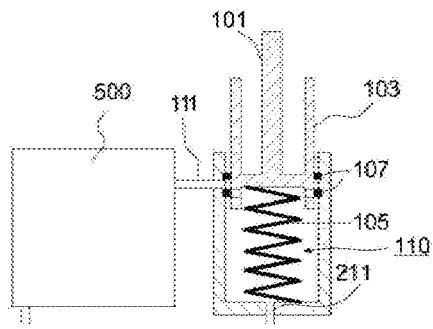
FIG. 3B is a view illustrating the initial position at which the pedal piston according to the present disclosure generates hydraulic pressure in a pedal chamber.

FIG. 3A is a view illustrating an initial position of the pedal piston 103 according to an embodiment of the present disclosure. FIG. 3B is a view illustrating the initial position at which the pedal piston 103 generates hydraulic pressure in the pedal chamber 110 according to an embodiment of the present disclosure.

Referring to FIG. 3A and 3B, the pedal chamber 110 has an ineffective section.

Before the driver presses the brake pedal, the pedal piston 103 is positioned such that the position of the flow path hole 102, into which the brake fluid is to be introduced through the pedal chamber supply flow path 111, does not go beyond an uppermost portion of the seal 107.

Thereafter, when the driver presses the brake pedal, the pedal piston 103 is moved downward. The flow path hole 102 passes a lowermost portion of the seal 107, such that the pedal chamber 110 cannot be supplied with any more brake fluid from the oil reservoir 500. From this position, the hydraulic pressure may be generated in the pedal chamber 110.

Therefore, the ineffective section, in which no hydraulic pressure is generated, exists in the pedal chamber 110 even though the pedal piston 103 is moved between the section illustrated in FIG. 3A and the section illustrated in FIG. 3B.

The second pressure device 200 generates therein the same pressure as the first pressure device 100. Driving power of the motor 300 may be generated as the motor 300 connected to one side of the second pressure device 200 operates.

The second pressure device 200 may be connected to the first pressure device 100 through a flow path in order to generate the pressure equal to the pressure of the first pressure device 100.

Because it is acceptable if the internal pressure of the second pressure device 200 and the internal pressure of the first pressure device 100 are equal to each other, the second pressure device 200 and the first pressure device 100 may be integrally formed.

The master chamber 220 may receive the resultant force of the brake pedal effort and the driving power of the motor 300 from a master piston 217 that reciprocally moves in the second pressure device 200.

The pressure balance detecting device 400 is a device that detects whether a predetermined ratio is maintained between the pressure of the first pressure device 100 applied to one side of the pressure balance detecting device 400 and the pressure of the master chamber 220 applied to the other side of the pressure balance detecting device 400. The pressure balance detecting device 400 may include a first switch 421 which operates when a ratio between the pressure of the first pressure device 100 and the pressure of the master chamber 220 is higher than a predetermined ratio. The pressure balance detecting device 100 may also include a second switch 423 which operates when the ratio between the pressure of the first pressure device 100 and the pressure of the master chamber 220 is lower than the predetermined ratio.

The pressure balance detecting device 400 detects whether the predetermined ratio is maintained between the pressure of the first pressure device 100 and the pressure of the master chamber 220 applied to the other side thereof. Therefore, the pressure balance detecting device 400 operates under a condition in which the pressure is generated in the first pressure device 100 and simultaneously, the pressure is generated in the master chamber 220.

The second pressure device 200 may include a boosting chamber 210.

The boosting chamber 210 has a cylinder that surrounds the boosting chamber 210. Brake fluid pressure, which is equal to the pressure of the first pressure device 100, is generated in the cylinder. The motor 300 may be coupled to one side of the boosting chamber 210.

To generate the brake fluid pressure equal to the pressure of the first pressure device 100, the boosting chamber may be connected to the pedal chamber 110 through a boosting chamber flow path 201 and may receive the brake fluid pressure from the pedal chamber 110.

Because it is acceptable if the internal pressure of the boosting chamber 210 and the internal pressure of the pedal chamber 110 are equal to each other, the boosting chamber 210 and the pedal chamber 110 may be integrally formed.

The boosting chamber 210 may be configured to indirectly receive brake pressure by receiving the brake fluid pressure generated in the pedal chamber 110 through the flow path of the pedal chamber 110. Alternatively, the boosting chamber 210 may be formed integrally with the pedal chamber 110. As a result, the pedal chamber 110 and the boosting chamber 210 are not restricted in terms of mounting positions thereof.

Therefore, according to the electric brake booster according to the present disclosure, the entire layout of the booster including the pedal chamber 110, the master chamber 220, or the motor 300 may be freely configured.

The second pressure device 200 according to the present disclosure may further include therein a screw 213, a nut 215, and the master piston 217.

The screw 213 may be coupled to the motor 300 and may be rotated in the second pressure device 200 in accordance with the operation of the motor 300.

The screw 213 may be coupled to the motor 300 and rotated in the second pressure device 200 in accordance with the operation of the motor 300.

The nut 215 serves to transmit driving power of the motor 300 to the master chamber 220. The nut 215 may be coupled to the screw 213 so as to surround a circumferential surface of the screw 213 and may be rectilinearly moved in the second pressure device 200 in accordance with the rotational motion of the screw 213.

A portion of the screw 213, which is coupled to the motor 300, may be formed in a T shape so that the screw 213 and the nut 215 are prevented from being decoupled from each other by the rectilinear motion of the nut 215. The screw 213 is coupled to the cylindrical nut 215 so as to be rotated in the second pressure device 200.

A bearing 203 may be further included between the screw 213 and the second pressure device 200 so as to assist the screw 213 in rotating and mitigate friction.

The second pressure device 200 has a hole having a predetermined width so that the motor 300 and the screw 213 are coupled to each other. A seal 211, which seals a gap between the screw 213 and the second pressure device 200, is provided in a hole formed in a chamber that surrounds the screw 213 and the boosting chamber 210. Thereby, a leakage of the brake fluid is prevented and pressure in the boosting chamber 210 is generated.

The master chamber 220 may receive, through the master piston 217, the resultant force of the driving power of the motor 300 mounted at the lateral side of the boosting chamber 210 and the pedal effort which is applied in the boosting chamber 210 and generated as the driver manipulates the brake pedal.

Therefore, the pressure generated in the master chamber 220 has a value made by adding the brake fluid pressure of the boosting chamber 210 to a value made by dividing the driving power of the motor 300 by an area AA in which the master piston 217 is in contact with the brake fluid in the boosting chamber 210.

One side of the master piston 217 is in contact with the nut 215. Therefore, when the screw 213 is rotated by the rotation of the motor 300 and thus the nut 215 is operated forward, the master piston 217 may also be operated forward by force of the nut 215 pushing the master piston 217.

The other side of the master piston 217 is connected to a return spring 223, such that the master piston 217 may return back to the original position and may reciprocally move in the boosting chamber 210.

The master chamber 220 may receive the brake fluid from the oil reservoir 500 through a master chamber supply flow path 221 connected to the oil reservoir 500. The pressure may be generated in the master chamber 220 by the reciprocating motion of the master piston 217 and the driving power of the motor 300 which is transmitted from the nut 215.

Seals 219, which seal a gap between the master chamber 220 and the boosting chamber 210 and the second pressure device 200, are mounted at both sides of the master chamber supply flow path 221 connected to the oil reservoir 500. Therefore, the master chamber 220 and the boosting chamber 210 may have different pressures.

The master chamber 220 may be supplied with the brake fluid from the oil reservoir 500 through the master chamber supply flow path 221 formed at one side of the master chamber 220. The master chamber 220 may be connected to an ESC module or a brake caliper through a master chamber flow path 225 formed in a lower portion of the master chamber 220.

The master chamber 220 may transmit, to the ESC module or the brake caliper, the resultant force of the driving power of the motor 300 and the pedal effort which is transmitted from the pedal chamber 110 and generated as the driver manipulates the brake pedal.

The electric brake booster equipped with the pressure balance detecting device 400 according to the present disclosure, may be controlled by an engine control unit (ECU). The master chamber 220 may be connected to the ESC module including the ECU for controlling the motor 300. The ESC module may be connected to the brake caliper.

If the booster has abnormality such as when a defect occurs in the motor 300, braking may be performed by the ESC module that serves as an auxiliary actuator.

The electric brake booster equipped with the pressure balance detecting device 400 according to the present disclosure may further include a pedal sensor that measures a displacement of the brake pedal. The pedal sensor may directly or indirectly measure the displacement of any one of the brake pedal, the push rod 101, and the pedal piston 103.

A sensor for measuring a rotation angle of the motor 300 is embedded in the motor 300. A rotation amount of the motor 300 may be determined depending on the displacement of the brake pedal.

This configuration may be implemented by: calculating the amount of change in volume of the pedal chamber 110 by means of an absolute displacement of the brake pedal which is measured by the pedal sensor; controlling a movement distance of the nut 215 so as to generate the amount of change in volume of the master chamber 220 as much as the amount of change in volume of the pedal chamber 110; and controlling the boost ratio between the pedal effort generated as the driver manipulates the brake pedal and the pressure generated by the driving power of the motor 300.

In this case, the movement distance of the nut 215 may be calculated based on the rotation angle of the motor 300 which is measured by the sensor mounted in the motor 300, and consequently, the rotation amount of the motor 300 may be determined depending on the displacement of the brake pedal in order to control the brake boost ratio.

Figure 4A:
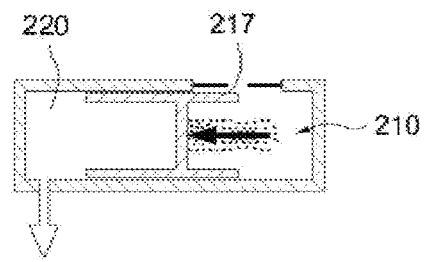
FIG. 4A is a view illustrating pressure applied to a master piston according to the present disclosure when a driver manipulates a brake pedal.
Figure 4B:
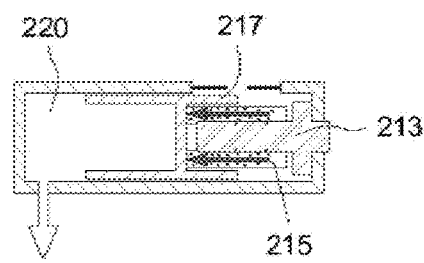
FIG. 4B is a view illustrating pressure applied to the master piston according to the present disclosure when a motor operates.
Figure 4C:
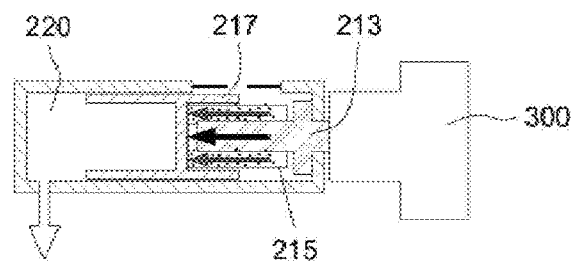
FIG. 4C is a view illustrating pressure applied to the master piston according to the present disclosure when the driver manipulates the brake pedal and the motor operates.

FIG. 4A is a view illustrating pressure applied to the master piston 217 according to the present disclosure when the driver manipulates the brake pedal. FIG. 4B is a view illustrating pressure applied to the master piston 217 according to the present disclosure invention when the motor 300 operates. FIG. 4C is a view illustrating pressure applied to the master piston 217 according to the present disclosure invention when the driver manipulates the brake pedal and the motor 300 operates.

Referring to FIGS. 4A to 4C, a clamping force of the nut 215, which results from the driving power of the motor 300, is transmitted to a portion of the master piston 217 that corresponds to a contact area with the nut 215.

Simultaneously, the pedal effort, which is generated as the driver manipulates the brake pedal, is transmitted to the area AA of the master piston 217 in which the master piston 217 is in contact with the brake fluid in the boosting chamber 210.

In other words, pressure, which is made by dividing the driving power of the motor 300 by a cross-sectional area of a contact portion between the nut 215 and the master piston 217, and the pressure of the pedal chamber 110 (equal to the pressure of the boosting chamber 210) are applied to the master piston 217. These pressures are transmitted to the master chamber 220.

Therefore, as illustrated in FIG. 4C, the output of the booster to be transmitted to the ESC module or the brake caliper is the sum of the clamping force of the nut 215 and force made by multiplying the pressure of the pedal chamber 110 by the area AA in which the master piston 217 is in contact with the brake fluid in the boosting chamber 210.

Figure 5A:
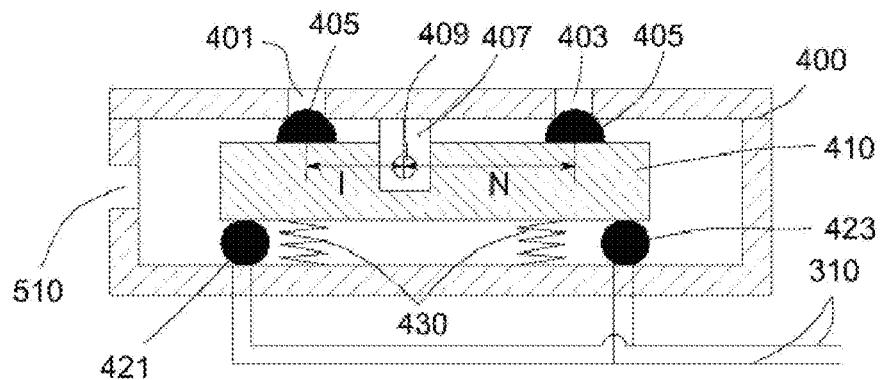
FIG. 5A is a view illustrating a front side of the pressure balance detecting device according to the present disclosure.

FIG. 5A is a view illustrating a front side of the pressure balance detecting device 400 according to the present disclosure.

The pressure balance detecting device 400 has, at one side thereof, a pressure balance detecting device supply flow path 510 through which the pressure balance detecting device 400 is supplied with the brake fluid from the oil reservoir 500, such that the interior of the pressure balance detecting device 400 may be filled with the brake fluid.

The pressure balance detecting device 400 may include a support unit 410, a pivot unit, the first switch 421, and the second switch 423.

The support unit 410 is mounted with springs 430 that support a lower surface of the support unit 410. The support unit 410 may have a bar shape so that the support unit 410 performs see-saw motion when a pressure ratio between the first pressure device 100 and the master chamber 220 is different from a predetermined pressure ratio.

The mounting position of the pivot unit varies depending on the predetermined pressure ratio between the master chamber 220 and the first pressure device 100, such that an axis of the see-saw motion of the support unit 410 may be defined.

The springs 430, which support the support unit 410, may be positioned at both sides of the pivot unit at an equal distance. The springs 430 may support a load of the support unit 410 and prevent the support unit 410 from shaking due to vibration of a vehicle.

The first switch 421 and the second switch 423 are mounted at both sides of a lower portion of the support unit 410. Any one of the first switch 421 and the second switch 423 may be operated in accordance with the see-saw motion of the support unit 410.

The pressure balance detecting device 400 may have a master chamber connecting port 401 which is connected to the master chamber 220 at an upper side of the support unit 410 and receives the brake fluid in the master chamber 220. The pressure balance detecting device 400 may further include a pedal chamber connecting port 403 which is connected to the first pressure device 100 and receives the brake fluid in the first pressure device 100.

The connecting ports serve to generate the pressure equal to the brake pressure in the master chamber 220 and the pressure in the first pressure device 100. The connecting ports may be configured to receive the internal pressure of the master chamber 220 and the internal pressure of the first pressure device 100 regardless of lengths of the connecting ports.

The internal pressure of the first pressure device 100 is equal to the internal pressure of the second pressure device 200 and equal to the internal pressure of the pedal chamber 110 or the boosting chamber 210, such that the pedal chamber connecting port 403 may be connected to the pedal chamber 110 or the boosting chamber 210.

Hemispheric plugs 405, which are in close contact with a lower portion of the master chamber connecting port 401 and a lower portion of the pedal chamber connecting port 403, respectively, are provided to maintain sealability against the brake fluid in the master chamber connecting port 401 and the pedal chamber connecting port 403. Therefore, the master chamber connecting port 401 and the pedal chamber connecting port 403 may form the pressure equal to the internal pressure of the master chamber 220 and the internal pressure of the first pressure device 100.

Figure 5B:
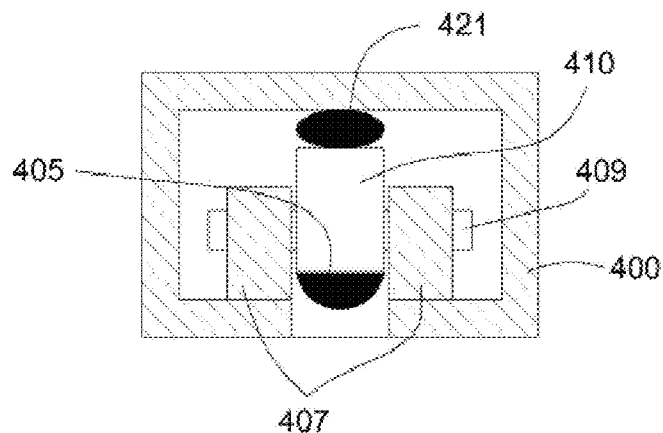
FIG. 5B is a view illustrating a lateral side of the pressure balance detecting device according to the present disclosure.

FIG. 5B is a view illustrating a lateral side of the pressure balance detecting device 400 according to the present disclosure.

Referring to FIG. 5B, the pivot unit may further include protrusions 407 and a pivot pin 409.

The two protrusions 407 may protrude from an upper portion of the pressure balance detecting device 400 such that the support unit 410 is positioned between the protrusions.

The pivot pin 409 may penetrate the protrusions 407 and the support unit 410, thereby coupling the pivot unit and the support unit 410.

When the pressure ratio between the master chamber 220 and the boosting chamber 210 is N:1, the pivot pin 409 of the pivot unit is coupled to the support unit 410 so that a ratio of a distance between the pivot pin 409 and the master chamber connecting port 401 to a distance between the pivot pin 409 and the pedal chamber connecting port 403 is 1:N.

Figure 6A:
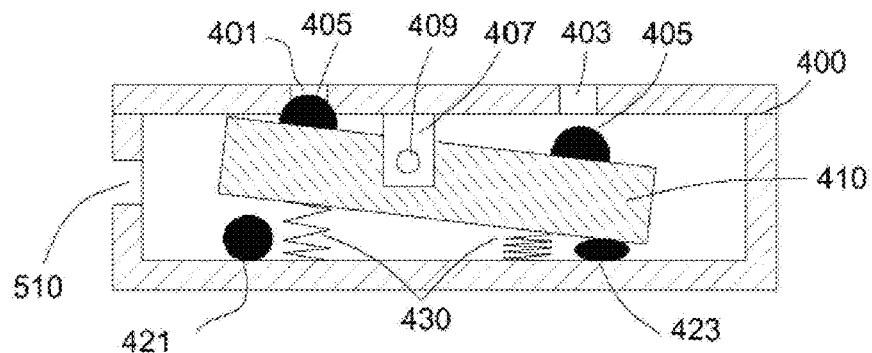
FIG. 6A is a view illustrating an operating mode of the pressure balance detecting device according to the present disclosure when a boost ratio between a master cylinder and a first pressure device is lower than a designed predetermined boost ratio.
Figure 6B:
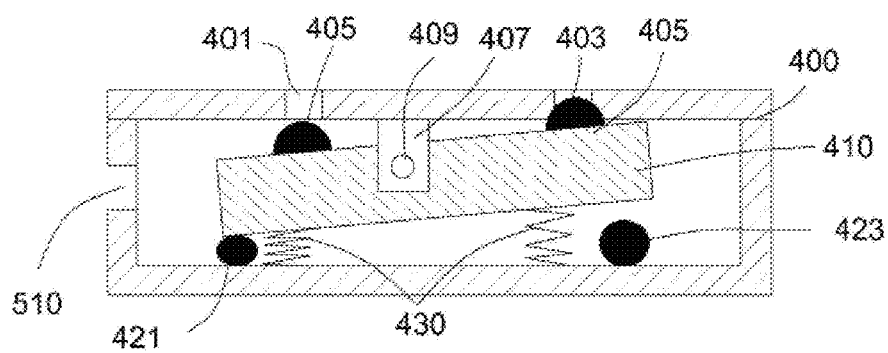
FIG. 6B is a view illustrating an operating mode of the pressure balance detecting device according to the present disclosure when the boost ratio between the master cylinder and the first pressure device is higher than the designed predetermined boost ratio.

FIG. 6A is a view illustrating an operating mode of the pressure balance detecting device 400 according to the present disclosure invention when the boost ratio between the master cylinder and the first pressure device 100 is lower than a designed predetermined boost ratio. FIG. 6B is a view illustrating an operating mode of the pressure balance detecting device 400 according to the present disclosure invention when the boost ratio between the master cylinder and the first pressure device 100 is higher than the designed predetermined boost ratio.

Referring to FIG. 2, signal lines 310, which are connected to the motor 300, a speed reducer, and the ECU, are provided, such that the switches may be supplied with electric power from the signal lines 310. The ECU may transmit signals for operating the motor 300 to the motor 300 and the speed reducer through the signal lines 310.

Referring to FIG. 6A, the behavior of the pressure balance detecting device 400 may be ascertained when the pressure of the master chamber 220 is lower than a required pressure and the boost ratio between the master chamber 220 and the first pressure device 100 is lower than the designed predetermined boost ratio.

In this case, the following condition is satisfied: (the pressure of the first pressure device 100*a distance from a center of the pivot pin 409 to a point of application of the pressure of the first pressure device 100 (the pedal chamber connecting port 403 connected to the first pressure device 100 or an apex of the plug 405 positioned in the pedal chamber connecting port 403))>(the pressure of the master chamber 220*a distance from the center of the pivot pin 409 to a point of application of the pressure of the master chamber 220 (an apex of the plug 405 positioned in the master chamber connecting port 401)).

Therefore, the support unit 410 in FIG. 6A moves clockwise and operates the second switch 423 positioned below the connecting port of the first pressure device 100.

In this case, the second switch 423 transmits, through the signal line 310, a signal for operating the motor 300 forward. As the motor 300 is operated forward, additional pressure is generated in the master chamber 220.

The motor 300 is operated forward until the pressure is additionally added to the master chamber 220, the boost ratio between the master chamber 220 and the first pressure device 100 reaches the designed predetermined boost ratio. Thus, the support unit is horizontally disposed.

FIG. 6B is a view illustrating an operating mode of the pressure balance detecting device 400 according to the present disclosure when the boost ratio between the master chamber 220 and the first pressure device 100 is higher than the designed predetermined boost ratio.

The following condition: (pressure of the first pressure device 100*the distance from the center of the pivot pin 409 to the point of application of the pressure of the first pressure device 100 (the pedal chamber connecting port 403 connected to the first pressure device 100 or the apex of the plug 405 positioned in the pedal chamber connecting port 403) <the pressure of the master chamber 220*the distance from the center of the pivot pin 409 to the point of application of the pressure of the master chamber 220 (the apex of the plug 405 positioned in the master chamber connecting port 401)) is satisfied in the case in which the pressure of the master chamber 220 is higher than the required pressure and the boost ratio between the master chamber 220 and the first pressure device 100 is higher than the designed predetermined boost ratio.

Therefore, the support unit 410 in FIG. 6B moves counterclockwise and operates the first switch 421 positioned below the master chamber connecting port 401.

In this case, the first switch 421 transmits, through the signal line 310, a signal for operating the motor 300 rearward. As the motor 300 is operated rearward, the pressure of the master chamber 220 is decreased.

The motor 300 is operated rearward until the pressure of the master chamber 220 is decreased, the boost ratio between the master chamber 220 and the first pressure device 100 reaches the designed predetermined boost ratio, and, thus, the support unit is horizontally disposed.

The pressure balance detecting device 400 may perform the aforementioned functions if one side of the pressure balance detecting device 400 is connected to the first pressure device 100 or to the pedal chamber 110 or the boosting chamber 210 which has the same pressure as the first pressure device 100, and the other side of the pressure balance detecting device 400 is connected to the master chamber 220. Therefore, the pressure balance detecting device 400 may not be restricted in terms of a mounting position thereof.

The pressure balance detecting device 400 may operate only under the condition in which pressure is generated in the first pressure device 100 and simultaneously, pressure is generated in the master chamber 220, as described above.

Therefore, the pressure balance detecting device 400 does not operate in a case in which no pressure is generated in the first pressure device 100 as an ESC or an Advanced Driver Assistance System (ADAS) function is implemented or only the motor 300 operates due to a stroke in an ineffective section of the pedal chamber 110.

An object and an effect of the present invention may be naturally understood or may become clearer from the following description, and the object and the effect of the present invention are not restricted only by the following description. In addition, in the description of the present invention, the specific descriptions of publicly known technologies related with the present invention will be omitted when it is determined that the specific descriptions may unnecessarily obscure the subject matter of the present invention.

What is claimed is:
1. An electric brake booster, comprising:
a first pressure device, which generates therein a brake fluid pressure as a driver manipulates a brake pedal;
a second pressure device, which generates therein the same brake fluid pressure as the first pressure device and generates driving power for a motor as the motor connected to one side of the second pressure device operates;
a master chamber, which receives a resultant force of a brake pedal effort and the driving power of the motor from a master piston that reciprocally moves in the second pressure device; and
a pressure balance detecting device, which detects whether a predetermined ratio is maintained between the brake fluid pressure of the first pressure device applied to one side of the pressure balance detecting device and a pressure of the master chamber applied to the other side of the pressure balance detecting device,
wherein the pressure balance detecting device further includes:
a bar-shaped support unit, which is mounted with springs for supporting a lower surface of the support unit and performs a see-saw motion when a pressure ratio between the first pressure device and the master chamber is different from a redetermined pressure ratio;
a pivot unit, which defines an axis of the see-saw motion of the support unit by varying a mounting position depending on a predetermined ratio between the pressure of the master chamber and the brake fluid pressure of the first pressure device;
a first switch, which operates when a ratio between the brake fluid pressure of the first pressure device and the pressure of the master chamber is higher than a predetermined ratio; and
a second switch, which operates when the ratio between the brake fluid pressure of the first pressure device and the pressure of the master chamber is lower than the predetermined ratio, wherein the first switch and the second switch are mounted at both sides of a lower portion of the support unit, and any one of the first switch and the second switch operates in accordance with the see-saw motion of the support unit.

2. The electric brake booster of claim 1, wherein the first pressure device further includes:
a pedal chamber, which is supplied with a brake fluid from an oil reservoir through a pedal chamber supply flow path formed at an upper side of the pedal chamber, wherein the pedal chamber generates brake fluid pressure in accordance with the manipulation of the brake pedal;
a push rod, which is rectilinearly moved in the pedal chamber in accordance with the manipulation of the brake pedal; and
a pedal piston, which has one end coupled to the push rod and the other end connected to a return spring, wherein the pedal piston is reciprocally moved in the pedal chamber in accordance with the rectilinear motion of the push rod.

3. The electric brake booster of claim 2, wherein the upper side of the pedal chamber is connected to the pedal chamber supply flow path, which is supplied with the brake fluid from the oil reservoir.

4. The electric brake booster of claim 1, wherein the second pressure device is connected to the first pressure device through a pedal chamber flow path.

5. The electric brake booster of claim 1, wherein the second pressure device is formed integrally with the first pressure device.

6. The electric brake booster of claim 1, wherein the second pressure device further includes a boosting chamber, which generates the same brake fluid pressure as the first pressure device and has the other side coupled to the motor.

7. The electric brake booster of claim 1, wherein the second pressure device further includes:
a screw, which is coupled to the motor and rotated in the second pressure device in accordance with the operation of the motor; and
a nut, which is coupled to the screw and rectilinearly moved in accordance with the rotational motion of the screw,
wherein the master piston has one side in contact with the nut and the other side connected to a return spring connected to one end of the master chamber, wherein the master piston is reciprocally moved in the second pressure device in accordance with the rectilinear motion of the nut and transmits the resultant force of the brake pedal effort and the driving power of the motor to the master chamber.

8. The electric brake booster of claim 1, further comprising:
a pedal sensor, which measures a displacement of the brake pedal,
wherein the pedal sensor measures a displacement of any one of the brake pedal, the push rod, and the pedal piston.

9. The electric brake booster of claim 8, wherein a sensor, which measures a rotation angle of the motor, is embedded in the motor, and a rotation amount of the motor is controlled based on the displacement of the brake pedal.

10. The electric brake booster of claim 1, wherein the master chamber is supplied with a brake fluid from an oil reservoir through a master chamber supply flow path formed at one side of the master chamber, and the master chamber is connected to an ESC module or a brake caliper through a master chamber flow path formed at the other side of the master chamber.

11. The electric brake booster of claim 1, wherein the pressure balance detecting device operates under a condition in which pressure is generated in the first pressure device, and simultaneously, pressure is generated in the master chamber.

12. The electric brake booster of claim 1, wherein the pressure balance detecting device further includes:
a master chamber connecting port, which is connected to the master chamber and receives the brake fluid in the master chamber;
a pedal chamber connecting port, which is connected to the first pressure device and receives the brake fluid in the first pressure device; and
hemispheric plugs, which are in contact with a lower portion of the master chamber connecting port and a lower portion of the pedal chamber connecting port to maintain sealability against the brake fluid in the master chamber connecting port and the pedal chamber connecting port.

13. The electric brake booster of claim 1, wherein the pivot unit further includes:
two protrusions, which protrude from an upper portion of the pressure balance detecting device, wherein the support unit is positioned between the protrusions; and
a pivot pin, which penetrates the protrusions and the support unit to couple the pivot unit and the support unit.

14. The electric brake booster of claim 1, wherein the first switch generates a signal for operating the motor rearward, and the second switch generates a signal for operating the motor forward.

15. The electric brake booster of claim 1, wherein the pressure balance detecting device has a pressure balance detecting device supply flow path formed at one side of the pressure balance detecting device to be supplied with a brake fluid from an oil reservoir.

16. An electric brake booster comprising:
a first pressure device, which generates therein a brake fluid pressure as a driver manipulates a brake pedal;
a second pressure device, which generates therein the same brake fluid pressure as the first pressure device and generates driving power for a motor as the motor connected to one side of the second pressure device operates;
a master chamber, which receives the resultant force of a brake pedal effort and the driving power of the motor from a master piston that reciprocally moves in the second pressure device; and
a pressure balance detecting device, which detects whether a predetermined ratio is maintained between the brake fluid pressure of the first pressure device applied to one side of the pressure balance detecting device and a pressure of the master chamber applied to the other side of the pressure balance detecting device,
wherein the pressure balance detecting device further includes:
a master chamber connecting port, which is connected to the master chamber and receives the brake fluid in the master chamber;
a pedal chamber connecting port, which is connected to the first pressure device and receives the brake fluid in the first pressure device;
hemispheric plugs, which are in contact with a lower portion of the master chamber connecting port and a lower portion of the pedal chamber connecting port to maintain sealability against the brake fluid in the master chamber connecting port and the pedal chamber connecting port;
a first switch, which operates when a ratio between the brake fluid pressure of the first pressure device and the pressure of the master chamber is higher than a predetermined ratio; and
a second switch, which operates when the ratio between the brake fluid pressure of the first pressure device and the pressure of the master chamber is lower than the predetermined ratio.

\* \* \* \* \*